United States Patent [19]
Hu et al.

[11] Patent Number: 5,299,756
[45] Date of Patent: Apr. 5, 1994

[54] FOIL WRAPPED FLEXIBLE WEB GUIDE

[75] Inventors: Paul Y. Hu; James L. Overacker, both of Tucson, Ariz.

[73] Assignee: International Business Machines Corporation, Armonk, N.Y.

[21] Appl. No.: 966,632

[22] Filed: Oct. 26, 1992

[51] Int. Cl.$^5$ .................. G11B 23/04; B65H 27/00
[52] U.S. Cl. ..................... 242/199; 242/76; 226/196
[58] Field of Search ............ 242/192, 197, 198, 199, 242/76; 226/196, 197; 360/132, 130.21

[56] References Cited

U.S. PATENT DOCUMENTS

| 2,170,545 | 8/1939 | Burton | 384/281 |
| 2,913,290 | 11/1959 | Jackman | 384/281 |
| 3,799,422 | 3/1974 | Matsumoto | 226/196 |
| 3,871,755 | 3/1975 | Wright | 242/199 X |
| 4,128,852 | 12/1978 | Senkpiel et al. | 242/192 X |
| 4,191,345 | 3/1980 | Sato | 242/197 |
| 4,276,575 | 6/1981 | Schoettle et al. | 226/196 X |
| 4,654,939 | 4/1987 | Silver | 29/149 |
| 4,685,005 | 8/1987 | Fields, Jr. | 360/53 |
| 4,736,904 | 4/1988 | Schoettle et al. | 242/199 |

FOREIGN PATENT DOCUMENTS 0217157 4/1987 European Pat. Off. .
2143208A 2/1985 United Kingdom .

OTHER PUBLICATIONS

IBM Technical Disclosure Bulletin vol. 24 No. 12 May 1982.

Primary Examiner—Daniel P. Stodola
Assistant Examiner—John P. Darling
Attorney, Agent, or Firm—M. W. Schecter

[57] ABSTRACT

A hydrodynamic tape guide includes a thin metal foil attached to a substrate by a pin inserted into a groove in the substrate. The groove is of a geometry including a first region of a relatively small width and at a relatively shallow depth and a second region of a relatively large width deeper into the substrate. The pin is of a thickness greater than the first width, but less than the second width.

21 Claims, 3 Drawing Sheets

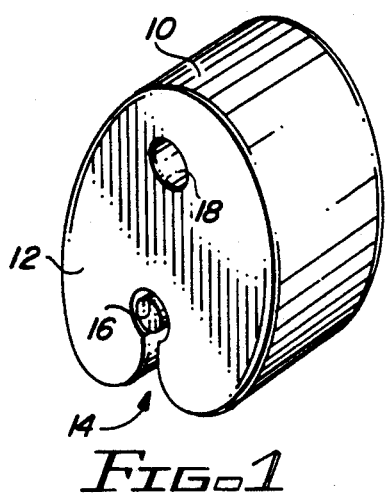
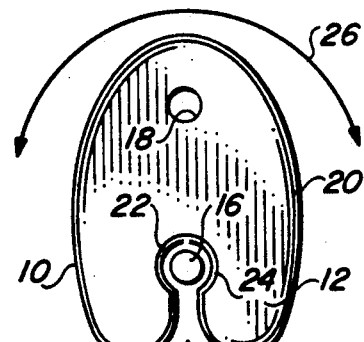
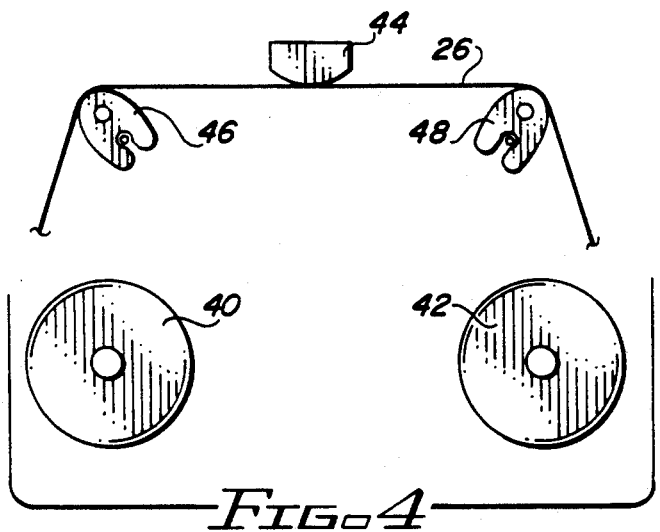
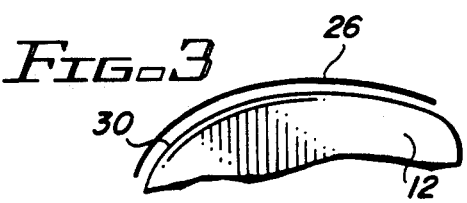
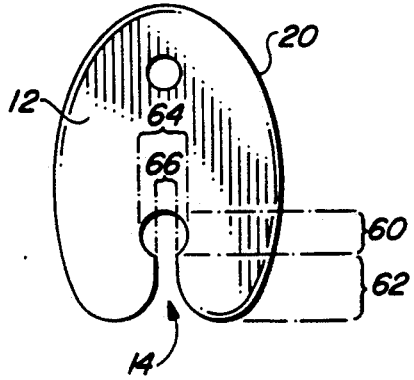
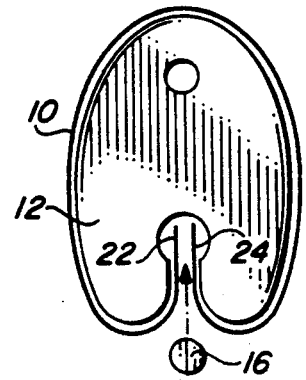

FOIL WRAPPED FLEXIBLE WEB GUIDE

BACKGROUND OF THE INVENTION

1. Field of the Invention

This invention relates to a flexible web guide. More particularly, the invention is a hydrodynamic tape guide including a thin metal foil attached to a substrate by a pin inserted into a groove in the substrate.

2. Description of the Related Art

Web and tape guiding apparatus are well known. A common use of such an apparatus is for guiding data tapes in magnetic or optical data tape drives over a read and/or write head. Guiding of the tape over the head is critical to the writing of data to and the reading of data from the tape. A typical magnetic tape drive includes several elements in the tape path to ensure proper alignment and operation of the tape and head. For example, the tape paths of the IBM 3480/3490 Magnetic Tape Subsystems include a supply reel inside a tape cartridge, a vibration decoupler, a cleaner blade, an arcuate supply side air bearing device, a magnetic read/write head, an arcuate storage side air bearing device, a tension transducer, a storage reel, and tape edge guides along the sides of the bearing surfaces. The tape edge guides are located along the arcuate bearing surfaces because the tape in such proximity can support a larger guiding force without collapsing than can freely suspended tape. The tape edge guides physically align the lateral position (i.e. in the direction of the tape width) of the tape relative to the read/write head. Lateral positioning maintains proper alignment between the read/write elements of the head and the data tracks on the magnetic tape. The tape guides also support and guide the tape in its easy direction of bending (i.e. in the direction of tape travel).

Guides for easy direction tape guiding may be pneumatic or hydrodynamic. A pneumatic tape guide includes an externally pressurized air bearing, as in the IBM 3480/3490 Magnetic Tape Subsystems. Although an air bearing can dramatically reduce tape friction and stiction, it is expensive to implement. An air bearing is expensive because it requires the space and parts for air to be provided under controlled pressure. A very expensive and acoustically noisy air pump must be provided to supply the necessary air flow and regulate air pressure to the air bearing. In the IBM 3480/3490 Magnetic Tape Subsystem, the air bearing surface is created by drilling large, solid metal bearings. Another known air bearing has attempted to reduce manufacturing costs by attaching a metal foil to a bearing block. Bareman et al, Air Bearing, IBM Technical Disclosure Bulletin, Vol. 24, No. 12, May, 1982, pp. 6603-6604. Unfortunately, the foil is attached to the block with screws which could tear, stretch, or otherwise damage the foil. Another air bearing includes a perforated metal foil adhesively attached to a substrate, as disclosed in commonly assigned, copending U.S. patent application Ser. No. 07/902.243, filed Jun. 22, 1992. Modern magnetic tape subsystems are growing increasingly smaller and, unfortunately, reducing the space available therein for an air pump.

Hydrodynamic, or non-pneumatic, tape guides do not include supplied air. Instead, these tape guides operate on the theory that a film of air forms between a tape and the tape guide when the tape is in motion, thereby reducing friction and wear. Two basic types of hydrodynamic tape guides are known. The first such guide is a fixed post. A fixed post is simple to implement, but suffers from stiction between the tape and the post when the tape is at rest and high impact friction during start/stop of tape motion. A second hydrodynamic tape guide is a roller. Compared to a fixed post, a roller reduces friction when the tape is in motion and reduces stiction when the tape is at rest. However, a roller introduces a source of vibration into the tape path which may disrupt the head-tape interface. A roller stores energy that must be positively controlled to maintain adequate closed loop tape tension, and steers tape differently than does a fixed post, often requiring grooves or other geometries to prevent the tape from flying too far away therefrom.

A hydrodynamic hybrid of a fixed post and roller is disclosed in commonly assigned, copending U.S. patent application Ser. No. 07/714,965, filed Jun. 13, 1991. Such application discloses a constrained pivot compound radius guide post mounted on an axle which allows it to pivot when the tape changes direction, thereby reducing startup stiction. Above a certain rotation angle the post is prevented from further rotation. The compound radius longitudinal contour reduces friction by maximizing the thickness of the air film between the tape and the post.

Hydrodynamic tape guides require a smooth and continuous tape bearing surface. In addition, the tape bearing surface must be electrically conductive to minimize static charge. Such bearing surfaces are known to be manufactured by machining, grinding, and/or lapping a block or cylinder of metal. Though less complex than air bearings, such manufacturing is still relatively expensive, particularly in modern low cost tape drives. Cast metal bearing surfaces are inexpensive, but are not sufficiently smooth for high speed tape drives. Molded plastic bearing surfaces are smoother, but not as smooth as lapped metal surfaces, and dimensional tolerances are not easily controlled particularly to generate a compound radius contour, if desired. Metal plated plastic bearing surfaces still further improve the smoothness, but increase the complexity and cost of manufacture.

A hydrodynamic tape guide employing a metal foil to reduce cost is disclosed in European Patent Application 0217157. Unfortunately, the techniques for attaching such metal foil to a substrate are inadequate. Adhesives are difficult to work with, and may fail during use. Simple resilient wrapping of the foil about the substrate is still more likely to fail during use. In addition, the foil is attached to the substrate with the ends overlapped, which can result in surface disruptions which interfere with tape travel, or which concentrate stress and result in failure of the metal foil. Other techniques for attaching a thin sleeve to a contoured substrate are known, but suffer from similar problems.

SUMMARY OF THE INVENTION

In view of the foregoing, it is the principal object of this invention to improve flexible web guides.

Another object of this invention is an inexpensive hydrodynamic tape guide which does not suffer from the aforementioned problems.

Still another object of this invention is an inexpensive hydrodynamic tape guide which provides a smooth, reliable tape bearing surface suitable for high performance tape drives.

These and other objects of this invention are accomplished by a hydrodynamic tape guide including a thin metal foil attached to a substrate by a pin inserted into a groove in the substrate. The groove is of a geometry including a first region of a relatively small width and at a relatively shallow depth and a second region of a relatively large width deeper into the substrate. The pin is of a thickness greater than the first width, but less than the second width.

The substrate is molded from conductive plastic or produced by casting or extruding metal. The metal foil is etched to a desired geometry. The foil is wrapped taut over the substrate, conforming to its macroscopic arcuate surface contour. The foil is sufficiently stiff so as not to conform to the microscopic topography of the substrate, thus providing an effective smoothening of substrate surface imperfections. The ends of the foil are tucked into the groove, reaching the second region but not overlapping. The pin is then inserted into the groove to retain the ends of the foil therein.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 1 is an isometric view of a tape guide according to the invention.

FIG. 2 is a side view of the tape guide with the metal foil exaggerated and a tape in guiding proximity thereto.

FIG. 3 is a front view of the top of the tape guide and a tape in guiding proximity thereto.

FIG. 4 is a schematic diagram of a data tape path according to the invention.

FIG. 5 is an isometric view of the tape guide substrate.

FIG. 6 is a side view of the tape guide substrate.

FIG. 7 is a side view of the tape guide substrate with the metal foil exaggerated and the pin and foil positioned prior to insertion of the pin into the groove.

DESCRIPTION OF THE PREFERRED EMBODIMENT

Figure 8:
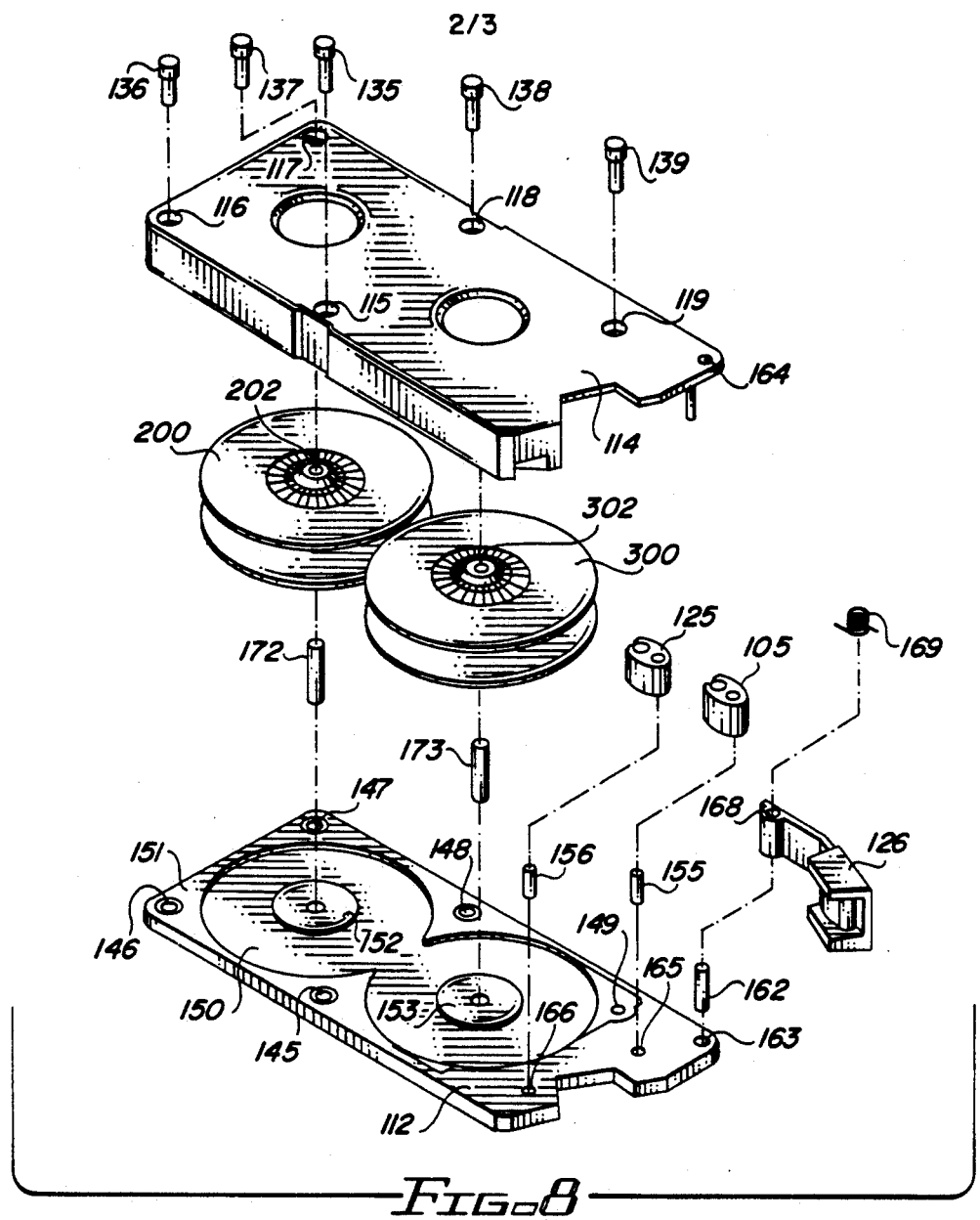
FIG. 8 is an exploded, isometric view of a tape cartridge including fixed position tape guides according to the invention.

Referring now more particularly to the drawing, like numerals denote like features and structural elements in the various figures. The flexible web guide of the invention will be described as embodied in a hydrodynamic tape guide for a magnetic or optical tape drive. Referring to FIG. 1, the tape guide according to the invention includes a thin metal foil 10 wrapped about an arcuate surface of a substrate 12. Metal foil 10 creates a smooth uniform tape bearing surface on the tape guide. Substrate 12 includes a groove 14 in a non-tape bearing portion thereof. A fastening pin 16 in groove 14 retains metal foil 10 upon substrate 12, as will be described. A hole 18 in substrate 12 may be used to anchor the tape guide in a fixed position of the tape path. For example, hole 18 may be used to threadably fasten the tape guide about a mounting pin fixed in the tape path. In alternative embodiments hole 18 may be used to pivot the tape guide about an axle, as will be described, or may be replaced with other means of fixing the position of the tape guide.

Because of the relative thickness of substrate 12 to metal foil 10, metal foil 10 is shown integral to substrate 12 in FIG. 1. Referring to FIG. 2, metal foil 10 is shown in exaggerated form spaced about the arcuate surface 20 of substrate 12. The ends 22 and 24 of metal foil 10 are pinched between fastening pin 16 and the interior surface of groove 14 to retain metal foil 10 on the surface 20 of substrate 12. Ends 22 and 24 do not overlap to prevent damage thereto by the pinching action which could result in failure of metal foil 10.

The tape guide is hydrodynamic because of the smooth arcuate contour of surface 20 and metal 10 thereon. The contour and smoothness required to produce a hydrodynamic tape guide is known in the art. A tape 26 is movable in the directions represented by the arrows at either end thereof. Tape 26 contacts the surface of the tape guide when at rest, or when moving at relatively low velocities. Tape 26 does not contact the surface of the tape guide when moving at relatively high nominal data read and/or write velocities. Instead, tape 26 flies over the tape guide on a film of air entrained therebetween. The thickness of the film is such that tape 26 is still within guidable proximity of (i.e. guided by) the tape guide.

Referring to FIG. 3, a front view of the top of the tape guide reveals the lateral profile of a tape bearing portion 30 of surface 20. Tape 26 moves into and out of the plane of the figure. Tape bearing surface portion 30 has a convex lateral contour which matches the lateral profile of tape 26. In alternative embodiments, the lateral contour may also be crowned or flat. The optimum lateral contour for an application will vary depending upon the stiffness of the tape, longitudinal contour of the tape guide, and operating parameters of the application.

Referring to FIG. 4, a data tape path employing the invention includes tape 26 wound at one end upon a first tape reel 40 and wound at the other end upon a second tape reel 42. Reels 40 and 42 are mechanically driven to rotate in either direction, as required to position the desired portion of tape 26 within read and/or write proximity of a magnetic or optical data read and/or write head 44 (such proximity is hereafter referred to as "data access proximity"). Two fixed position tape guides 46 and 48 guide the tape within data access proximity of head 44. Head 44 includes one or more transducers each capable of magnetically or optically accessing data on tape 26.

The type of head 44 is not relevant to the subject invention. A thin film, interleaved multi-track magnetic transducing head including inductive or magnetoresistive read and/or write transducers, as described, for example, in U.S. Pat. No. 4,685,005 or commonly assigned co-pending U.S. patent application Ser. No. 07/634679, filed Dec. 26, 1990, now U.S. Pat. No. 5,161,299, would be suitable. Although unnecessary for an understanding of how to make and use the invention. Both of the aforementioned items are hereby incorporated by reference. Head 44 may be wider than the tape cartridge and able to move laterally relative to tape 26 to align the transducing elements of head 44 to the data tracks on tape 26. If so, head 44 is moved laterally by a stepper motor, voice coil motor, or other known means. The lateral position of head 44 relative to tape 26 may be sensed by any known means, including a continuous servo loop. Further description of the head positioning means is not relevant to the invention. Tape 26 may be any known tape, such as magnetic or optical audio, video, or computer tape. The active recording layer may be any known, such as chromium dioxide or metal particle magnetic layers. Tape 26 may be of any width, such as ¼ inch, ½ inch, or 8 millimeter.

METHOD OF MANUFACTURE

Referring to FIGS. 5-7, the manufacture of the tape guide according to the invention will now be described. Substrate 12 is molded from conductive plastic such as polyproplene with a carbon additive, or produced by casting or extruding metals such as aluminum or sintering steel. The conductivity of substrate 12 is required to minimize static charge near tape 26. Groove 14 in substrate 12 includes two regions 60 and 62 of different width. Region 60 is of a relatively greater depth into substrate 12 than is region 62. Region 60 has a width 64 which is relatively greater than a width 66 of region 62.

Metal foil 10 is stainless steel, brass, or aluminum of approximately 0.1 micrometers or less surface roughness and of approximately 25-250 micrometers thickness. Such smoothness is required for high performance magnetic tape applications. Thicker foils do not conform easily to the macroscopic arcuate contour of surface 20 of substrate 12. Thinner foils do not maintain sufficient stiffness to avoid conforming to the microscopic contour of surface 20. The proper thickness of foil actually covers over imperfections in surface 20, thereby eliminating the need for a similar surface smoothness in surface 20. In addition, thinner foils do not retain their surface smoothness, or are too easily creased or otherwise damaged during manufacturing. Known techniques such as calendaring, chemical and/or mechanical polishing, lapping may be used to achieve the desired surface qualities. Metal foil 10 is etched to the desired geometry. Metal foil 10 may also be manufactured from other relatively hard, non-corrosive, conductive materials which may be manufactured to the same tolerances.

Metal foil 10 is wrapped taut over substrate 12, conforming to the macroscopic contour of arcuate surface 20, with ends 22 and 24 tucked into groove 14 (see FIG. 7). Ends 22 and 24 are inserted until metal foil 10 is taut, extending into region 60. Fastening pin 16 is then inserted into groove 14 (in the direction of the arrow shown in FIG. 7) to retain ends 22 and 24 therein. Pin 16 is thicker than width 66 of region 62, but thinner than width 64 of region 60. The thickness of pin 16 plus twice the thickness of metal foil 10 should be approximately the same as width 64 of region 60. In the preferred embodiment, pin 16 is manufactured from materials such as brass, copper, plastic or neoprene which are resilient enough to deform to an oblong shape to fit through region 62, yet retake its original shape over in region 60. Thus, pin 16 can be forced through region 62 of groove 14 and snug fit, with ends 22 and 24, within region 60.

TAPE CARTRIDGES

Figure 9:
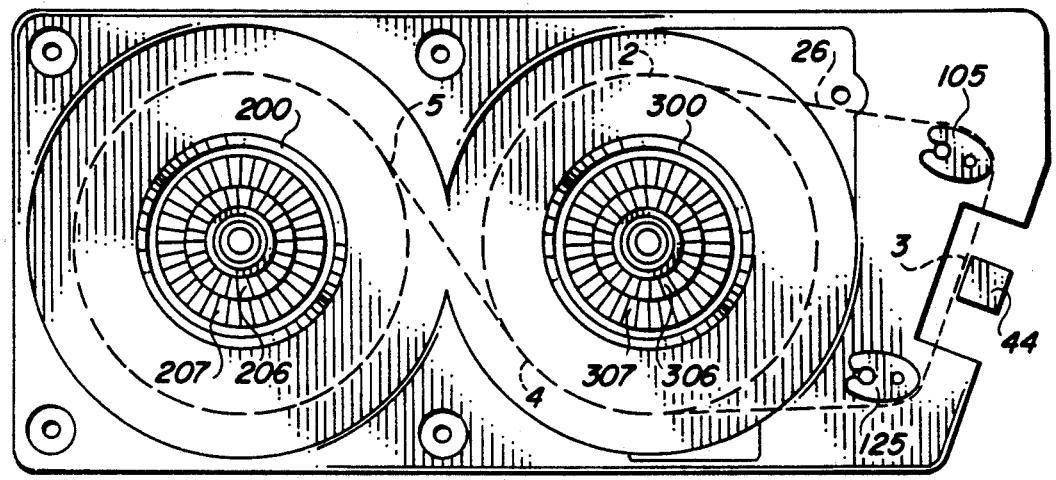
FIG. 9 is a top view of the tape cartridge with the cover and pivoting access door removed, and a tape head inserted into the tape path.

Referring to FIGS. 8-9, a tape cartridge including the invention will now be described. For convenience, no tape is shown in FIG. 8. A set of screws 135-139 are inserted through a set of holes 115-119 and thread into a set of holes 145-149 in a mount plate 112 to secure a cover 114 to mount plate 112. A pin 162 secures mount plate 112 at a hole 163 to cover 114 at a hole 164. Pin 162 is inserted through a hole 168 to permit pivoting of an access door 126. A spring 169 biases access door 126 toward its closed position.

Mount plate 112 includes various inner surfaces. A set of inner mount surfaces 151-153 are in the same mount plane. Because mount surfaces 151-153 are in the same plane, various tape cartridge components can be precisely positioned relative to a tape cartridge mount (not shown) in a tape drive and to each other. An inner surface 150 is recessed into the mount plane to permit the unobstructed rotation of two tape reels 200 and 300.

Two pins 155-156 locate two tape guides 105 and 125 to two holes 165-166, respectively. Tape guides 105 and 125 are fixed position tape guides as previously described, except for any shaping required to fit within the tape cartridge. Two axles 172 and 173 are secured to mount surfaces 152 and 153, respectively. The hubs of two toothed hub tape reels 200 and 300 are rotatably mounted upon hub axles 172 and 173, respectively. Axles 172 and 173 extend through two hub holes 202 and 302, respectively. In alternate embodiments, compliant tape edge guiding members may also be provided.

Referring to FIG. 9, tape 26 (dotted line) is shown wound on tape reels 200 and 300. Tape 26 may be wound from tape reel 300 to tape reel 200, or vice-versa. For the former, tape 26 exits from tape reel 200 at region 2, extends around tape guide 105, through a head region 3, around tape guide 125, forms a squeeze bearing 4 with tape still wound upon tape reel 300, and is spooled on to tape reel 200 at region 5. The tape path is reversed when tape 26 is wound from tape reel 200 to tape reel 300.

The tape is wound by the action of a motor (not shown) in the tape drive which drives a toothed hub 206 of tape reel 200 and/or a toothed hub 306 of tape reel 300. The motor engages hubs 206 and 306 through universal self-axially-aligning clutches. When the clutches are disengaged from hubs 206 and 306, the rotation of hubs 206 and 306 is prevented by the action of a toothed circular brake 207 and a toothed circular brake 307, respectively, against tabs (not shown) on the inside of cover 114. When the clutches engage hubs 206 and 306, brakes 207 and 307 are depressed into circular wells in the respective hubs to space the brakes from the hubs to thereby free reels 200 and 300 for rotation. Brakes 207 and 307 are resiliently biased against the tabs by springs in the wells. The aforementioned clutches, tabs, wells, and springs are not shown in the figures as they are not relevant to the subject invention.

Squeeze bearing 4 assists in the control of vibration and entrained air. A squeeze bearing is a thin layer of a gas (such as air) used to support a solid physical element. Here, squeeze bearing 4 is an "implicit" squeeze bearing in that it is formed by allowing tape 26 to come within close proximity of itself—no ancillary devices are used. In actual operation, squeeze bearing 4 does not allow tape 26 to contact itself. At normal operating velocities, a thin film of air is formed between the two surfaces of the tape. The two surfaces have identical velocities, thereby precluding wear of either surface. When tape 26 is motionless or moving at low velocities (e.g. during start ups and stoppages), the squeeze bearing collapses and the tape actually contacts itself. In either condition, the tape actually applies a force to itself. The amount of force applied depends upon the winding rates, tensions, and geometries. Squeeze bearing 4 damps tape tension variation, inhibits vibration from tape reel 200 from being transmitted along the tape to the head-tape interface at region 3, and exhausts entrained air otherwise entrapped between the wound wraps of the tape on tape reel 300.

Tape head 44 is shown mated (i.e. in data access proximity) with tape 26 at head region 3 as it would be when the tape cartridge is inserted into a tape drive (not shown) and seated in the tape cartridge mount therein with access door 126 in the open position. Tape guides 105 and 125 guide tape 26 in the proximity of the tape head while minimizing friction and wear. Such guiding permits tape head 44 to write data to, and/or read data from, tape 26. When the tape cartridge is not inserted into a tape drive, access door 126 is closed and occupies the space occupied by head 44 when the tape cartridge is inserted in the tape drive to prevent tape 26 from being drawn taut straight between bearings 105 and 125.

Hubs 206 and 306, brakes 207 and 307, and the flanges of the tape reels are molded plastic, such as polycarbonate, which may be glass-filled. Mount plate 112 is a piece of solid (i.e. not hollow) metal stock, such as stainless steel or anodized aluminum, which is machined simultaneously to create the various surfaces thereon, including mount surfaces 151-153 in the same plane. The pivoting access door is manufactured from a molded plastic, such as polycarbonate (which may again be glass-filled), with a flexible, low density polyethylene interior. The remaining parts of the tape cartridge may be plastic, thereby achieving high performance at reduced cost.

To assemble the tape cartridge tape 26 is wound entirely upon one tape reel. The tape guides, both tape reels, and pivoting access door are mated with the mount plate using the axles, pins and screws shown in the figures and suitable adhesives, and tape 26 is threaded through the tape path to the other tape reel. Cover 114 is then attached to the mount plate with screws to complete the tape cartridge.

Figure 10:
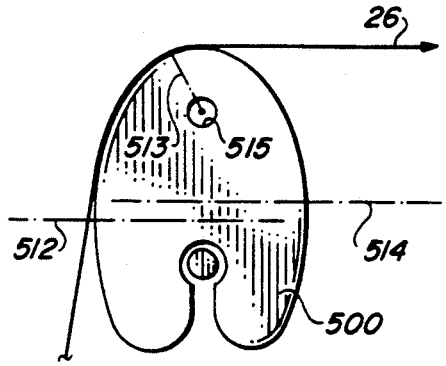
FIG. 10 is a side view of a constrained pivot tape guide according to the invention and a tape in guiding proximity thereto moving in a first direction.
Figure 11:
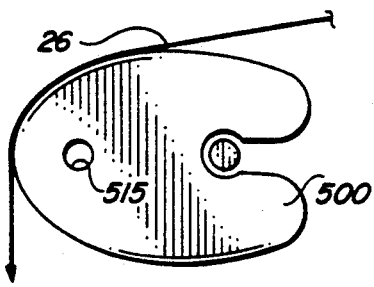
FIG. 11 is a side view of a constrained pivot tape guide according to the invention and a tape in guiding proximity thereto moving in the reverse direction of that shown in FIG. 10.

Although unnecessary for an understanding of how to make and use the invention, additional disclosure relating to the tape cartridge may be found in commonly assigned, copending patent application serial number 07/902,243, filed Jun. 22, 1992, hereby incorporated by reference. Referring to FIGS. 10-11, an alternate embodiment of the invention will now be described. In the alternate embodiment, the tape guide is configured as a constrained pivot tape guide. Tape 26 is shown bent in its easy direction around a tape guide 500. Tape guide 500 includes a compound radius of curvature that changes along the length of the tape bearing surface. The compound radius of curvature minimizes friction and stiction. Two portions of tape guide 500 have relatively large radii of curvature 512 and 514 to establish a thick air film that will lubricate the other portions. A central portion has a relatively small radius of curvature 513 to allow for any desired bending of tape 26 in its easy direction. Two blending portions join the outer portions with the central portion by providing a smooth transition between the distinct radii. Whereas the blending portions are not easily manufactured smooth by prior manufacturing techniques such as casting, grinding, etc., the foil (not shown) easily and smoothly blends abrupt changes in radii.

Guide 500 is a post mounted to pivot about an axle 515. Tape 26 may travel in either direction. As shown, tape 26 is either at rest, or moving in the direction shown by the arrow at either end thereof. Assume that tape guide 500 is at rest after tape 26 has last moved in the direction to the extreme right in FIG. 10. At the start of tape movement in the reverse direction (i.e. toward the lower left portion of FIG. 10), tape 26 is in contact with tape guide 500 which pivots counterclockwise as a result of stiction between the tape and guide. As tape guide 500 pivots, the tape which has adhered to the guide is peeled away, and a hydrodynamic air bearing is formed between the tape and the guide as the tape velocity is increased to its nominal operating value. This pivoting action is shown in FIG. 11. Since peeling stiction for a flexible web is much smaller than sliding stiction, the stiction and resulting wear is greatly reduced.

At the nominal operating tape velocity, tape guide 500 ceases to rotate either because of contact with a mechanical stop (not shown) or because the tape tension prevents the guide from rotating into a position where it deflects tape 26 far beyond its original path. This "self-acting" stop occurs when the drag between the tape and the guide equals the restoring torque exerted by the tape under tension. If the direction of tape movement reverses again, tape guide 500 again pivots clockwise. Guide 500 thus has two stable positions and is not a simple roller, but a post which acts like a roller through a limited angle of rotation. The position of tape guide 500 depends upon the direction of tape movement (or in the case of a motionless tape, upon the last direction of tape movement). The pivoting action assures that tape 26 engages the bearing surface over the large radius portions. The two rounded tail portions on either side of the groove provide a smooth slope away from tape 26, thereby preventing tape 26 from abrading the foil during changes in the position of guide 500.

Although unnecessary for an understanding of how to make and use the invention, additional disclosure relating to constrained pivot tape guides may be found in commonly assigned, copending U.S. patent application Ser. No. 07/714,965, filed Jun. 13, 1991.

Figure 12:
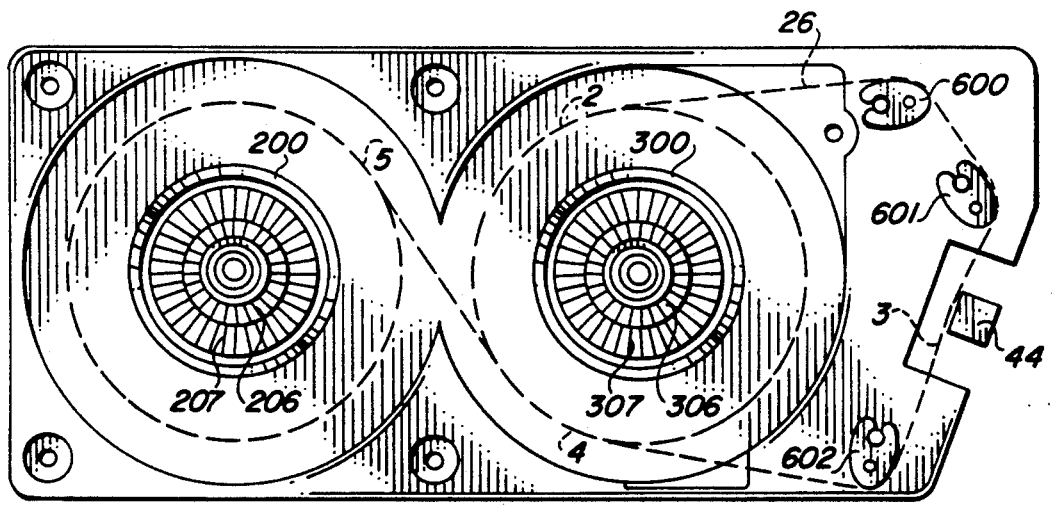
FIG. 12 is a top view of a tape cartridge including constrained pivot tape guides therein with the cover and pivoting access door removed, and a tape head inserted into the tape path.

A tape cartridge including constrained pivot tape guides according to the invention is shown in FIG. 12. The tape cartridge includes the same features as that shown in FIG. 9, except that tape guides 105 and 125 have been replaced with constrained pivot tape guides 600-602. Tape guides 600-602 are shown as though tape 26 is, or last was, moving from tape reel 300 to tape reel 200.

While the invention has been described with respect to a preferred embodiment thereof, it will be understood by those skilled in the art that various changes in detail may be made therein without departing from the spirit, scope, and teaching of the invention. For example, any number of tape guides according to the invention could be used in the tape paths described herein. In addition, the tape guides could be implemented in other tape paths. Finally, the invention could be could be useful for flexible web guiding applications other than data tape guiding. Accordingly, the invention disclosed herein is to be limited only as specified in the following claims.

What is claimed is:

1. A flexible web guide comprising:
   a substrate having an endless surface of arcuate contour with a groove therein, the groove having a first width at a first depth into the substrate and a second width at a second depth into the substrate, the first width less than the second width, the first depth less than the second depth;
   a metal foil having first and second ends, the foil wrapped about the surface and conforming to the contour of the substrate, the first and second ends extending further into the groove than the first depth; and
   a pin extending further into the groove than the first depth and having a thickness greater than the first width and less than the second width, the pin retaining the first and second ends in the groove.

2. The web guide of claim 1 wherein the first and second ends do not overlap.

3. The web guide of claim 2 wherein the pin has a round cross-section.

4. The web guide of claim 3 wherein the substrate comprises conductive plastic or metal.

5. The web guide of claim 2 wherein the substrate comprises conductive plastic or metal.

6. The tape guide of claim 1 wherein the pin has a round cross-section.

7. The web of claim 6 wherein the substrate comprises conductive plastic or metal.

8. The when guide of claim 1 wherein the substrate comprises conductive plastic or metal.

9. The web guide of claim 1 wherein the pin is sufficiently resilient to permit deformation to a thickness less than the first width.

10. The web guide of claim 1 wherein the foil has a thickness less than 250 micrometers.

11. The web guide of claim 1 wherein the foil has a surface roughness less than 0.1 micrometers.

12. A data tape path comprising
    means for mounting a first reel and a second reel;
    a tape head; and
    a first tape guide and a second tape guide positioned with the tape head therebetween such that a tape wound upon the first reel may extend therefrom guidably around the first tape guide, within data access proximity of the tape head, guidably around the second tape guide, and then be wound upon the second reel, the first tape guide and the second tape guide each comprising:
       a substrate having an endless surface of arcuate contour with a groove therein, the groove having a first width at a first depth into the substrate and a second width at a second depth into the substrate, the first width less than the second width, the first depth less than the second depth;
       a metal foil having first and second ends, the foil wrapped about the surface and conforming to the contour of the body, the first and second ends extending further into the groove than the first depth; and
       a pin extending further into the groove than the first depth and having a thickness greater than the first width and less than the second width, the pin retaining the first and second ends in the groove.

13. The tape path of claim 12 wherein the first and second ends do not overlap.

14. The tape path of claim 12 wherein the pin has a round cross-section.

15. The tape path of claim 12 wherein the substrate comprises conductive plastic or metal.

16. The web guide of claim 12 wherein the pin is sufficiently resilient to permit deformation to a thickness less than the first width.

17. A tape cartridge comprising:
    a first reel and a second reel;
    a first tape guide and a second tape guide each comprising:
       a substrate having an endless surface of arcuate contour with a groove therein, the groove having a first width at a first depth into the substrate and a second width that a second depth into the substrate, the first width less than the second width, the first depth less than the second depth;
       a metal foil having first and second ends, the foil wrapped about the surface and conforming to the contour of the body, the first and second ends extending further into the groove than the first depth;
       a pin extending further into the groove than the first depth and having a thickness greater than the first width and less than the second width, the pin retaining the first and second ends in the groove; and
       a tape wound upon the first reel and extending therefrom guidably around the first tape guide, guidably around the second tape guide, and then wound upon the second reel.

18. The tape path of claim 17 wherein the first and second ends do not overlap.

19. The tape path of claim 17 wherein the pin has a round cross-section.

20. The tape path of claim 17 wherein the substrate comprises conductive plastic or metal.

21. The web guide of claim 17 wherein the pin is sufficiently resilient to permit deformation to a thickness less than the first width.

* * * * *

UNITED STATES PATENT AND TRADEMARK OFFICE
CERTIFICATE OF CORRECTION

PATENT NO. : 5,299,756
DATED : April 5, 1994
INVENTOR(S) : Paul Y. Hu, et al.

It is certified that error appears in the above-identified patent and that said Letters Patent is hereby corrected as shown below:

At column 9, line 25, "tape" should be --web--.

At column 9, line 27, after "web", insert --guide--; at line 29, "when" should be --web--.

At column 10, line 29, "that" should be --at--.

Signed and Sealed this

Sixth Day of September, 1994

BRUCE LEHMAN

Attest:

Attesting Officer

Commissioner of Patents and Trademarks